United States Patent
Cook

(10) Patent No.: US 9,047,040 B2
(45) Date of Patent: Jun. 2, 2015

(54) METHOD FOR RUNNING COMPUTER PROGRAM ON VIDEO CARD SELECTED BASED ON VIDEO CARD PREFERENCES OF THE PROGRAM

(75) Inventor: Steven D. Cook, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 2412 days.

(21) Appl. No.: 11/767,674

(22) Filed: Jun. 25, 2007

(65) Prior Publication Data
US 2008/0316200 A1    Dec. 25, 2008

(51) Int. Cl.
*G06F 3/00*    (2006.01)
*G06F 3/14*    (2006.01)

(52) U.S. Cl.
CPC .................................. *G06F 3/1438* (2013.01)

(58) Field of Classification Search
USPC .................................................. 715/717, 718
See application file for complete search history.

(56) References Cited

U.S. PATENT DOCUMENTS

| | | | |
|---|---|---|---|
| 6,151,034 A | 11/2000 | Jain et al. | |
| 6,825,844 B2 | 11/2004 | Hill et al. | |
| 7,612,783 B2 * | 11/2009 | Koduri et al. | 345/611 |
| 7,617,348 B2 * | 11/2009 | Danilak | 710/305 |
| 2004/0139308 A1 | 7/2004 | Foster et al. | |
| 2005/0062678 A1 * | 3/2005 | Mark et al. | 345/2.1 |
| 2005/0088445 A1 * | 4/2005 | Gonzalez et al. | 345/502 |
| 2005/0278682 A1 | 12/2005 | Dowling | |
| 2006/0098020 A1 * | 5/2006 | Shen et al. | 345/520 |
| 2007/0139423 A1 * | 6/2007 | Kong et al. | 345/502 |
| 2008/0211816 A1 * | 9/2008 | Gonzalez et al. | 345/505 |

FOREIGN PATENT DOCUMENTS

| | | | |
|---|---|---|---|
| EP | 1376349 A1 | | 1/2004 |
| JP | 2003315468 | * | 9/2003 |
| TW | 200424889 A | | 11/2004 |
| TW | 200511106 A | | 3/2005 |

OTHER PUBLICATIONS

Nvidia Coporation, Nvidia nTune Generation 5.0 User's Guide, Nov. 9, 2006 Version 2.*
Curtis et al; an Intergrated Robotic Multi-Modal Rang Sensing System; © 2005; IEEE; 6 pages.*
Boukerche et al.; A Capture and Access Mechanism fro Accurate Recording and Playing of 3D Virtual Environment Simulations; © 2006; IEEE; 8 pages.*

* cited by examiner

*Primary Examiner* — Linh K Pham
(74) *Attorney, Agent, or Firm* — Steven Bennett

(57) ABSTRACT

A parameter relating to the video card preferences of a target computer program is determined. In response to the target computer program being started on a computing device having a number of video cards, one of these video cards is selected to run the target computer program on, based on the parameter. The target computer program is then run on the video card selected. The parameter may include the specific identify of one of the video cards on which the target computer program is to be run, as well as other types of parameters that do not specifically identify any of the video cards. The video card preferences of the target computer program may also include video card requirements of the target computer program.

21 Claims, 5 Drawing Sheets

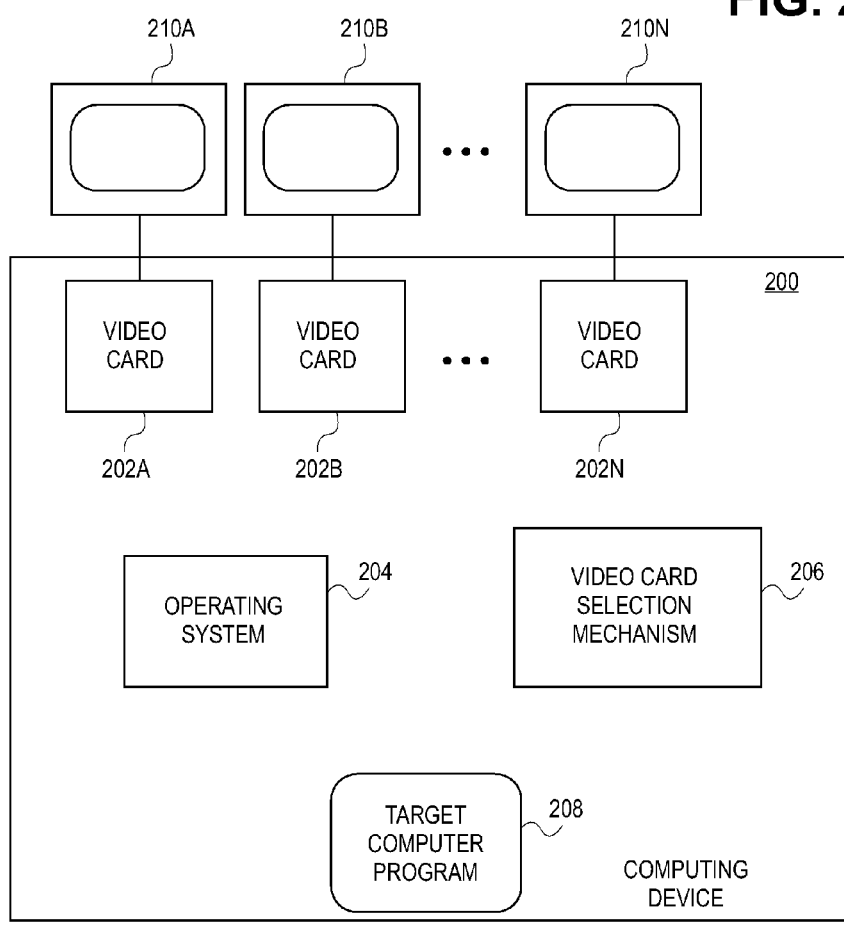

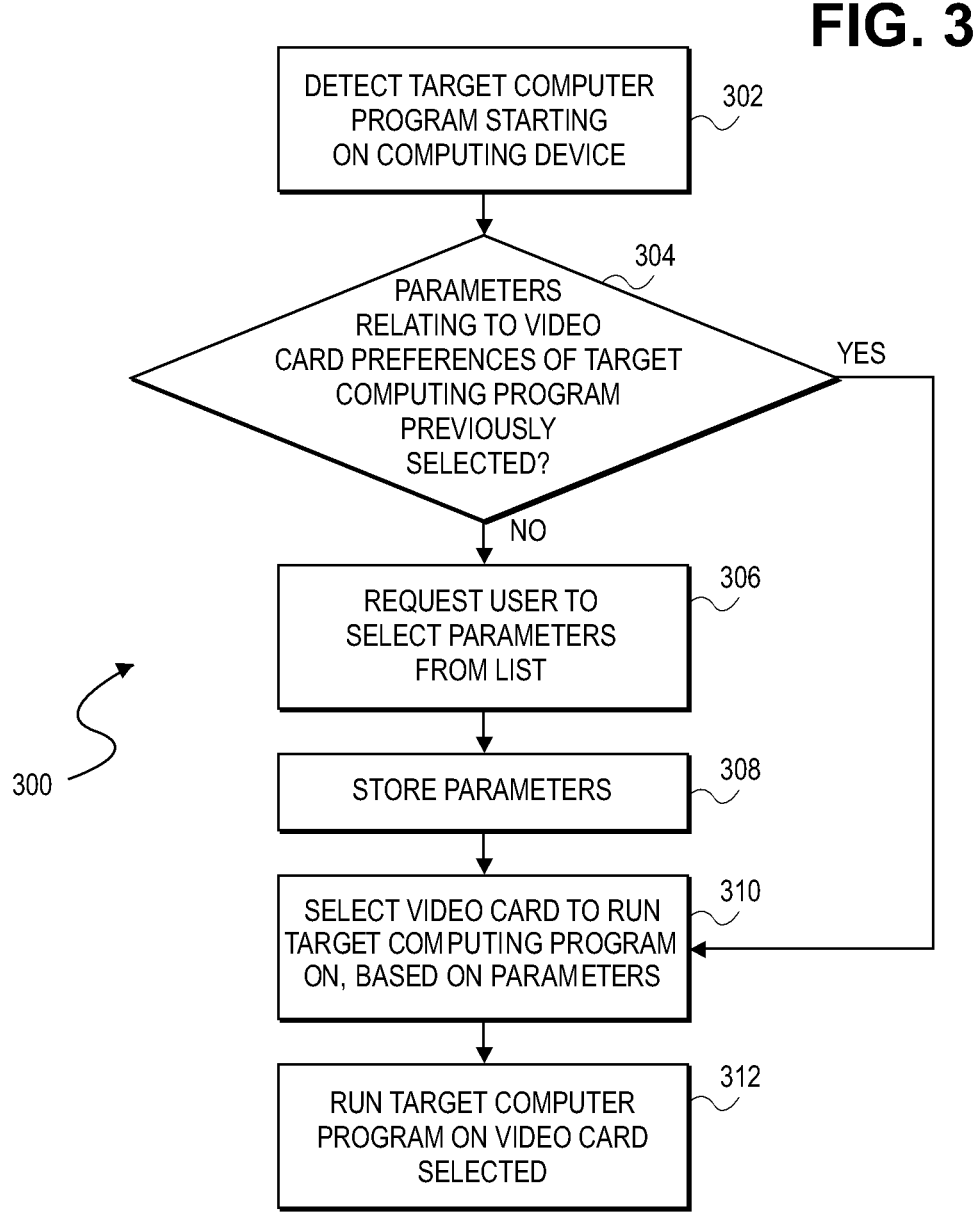

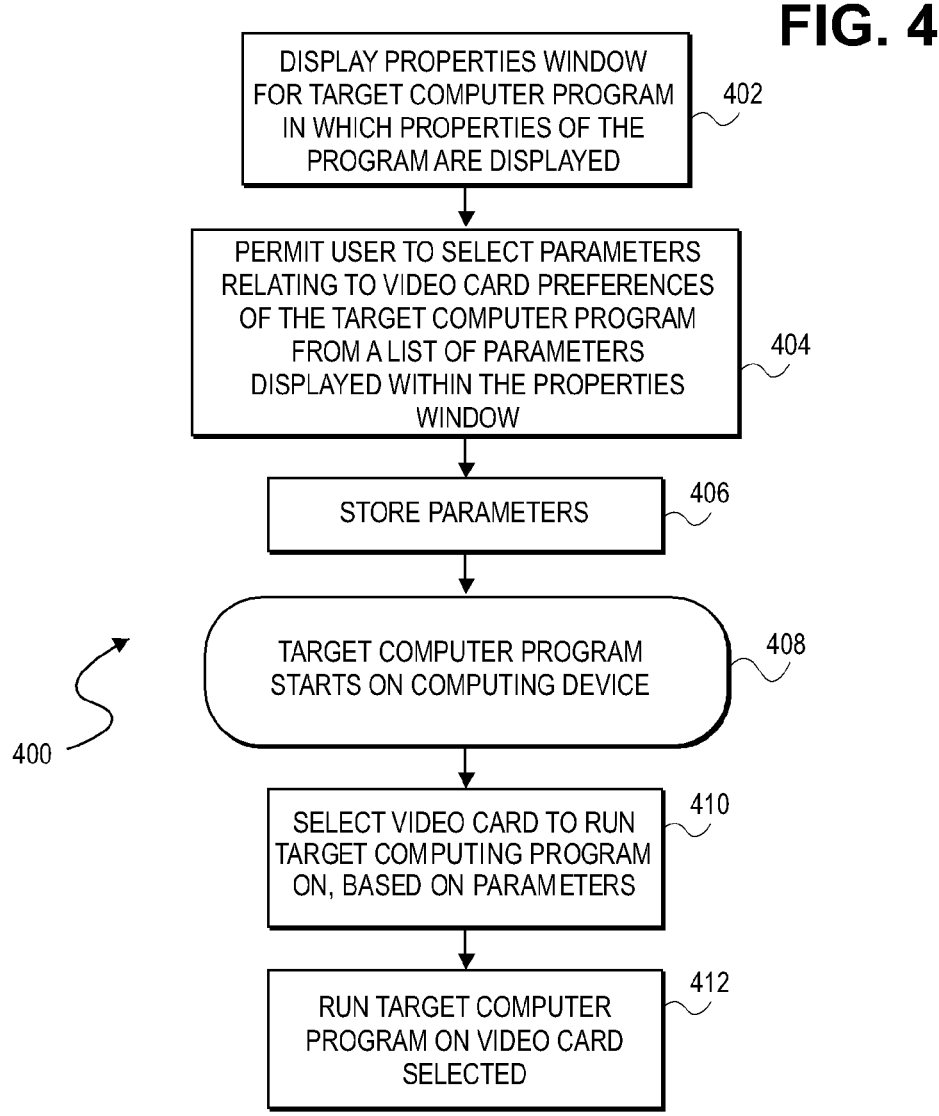

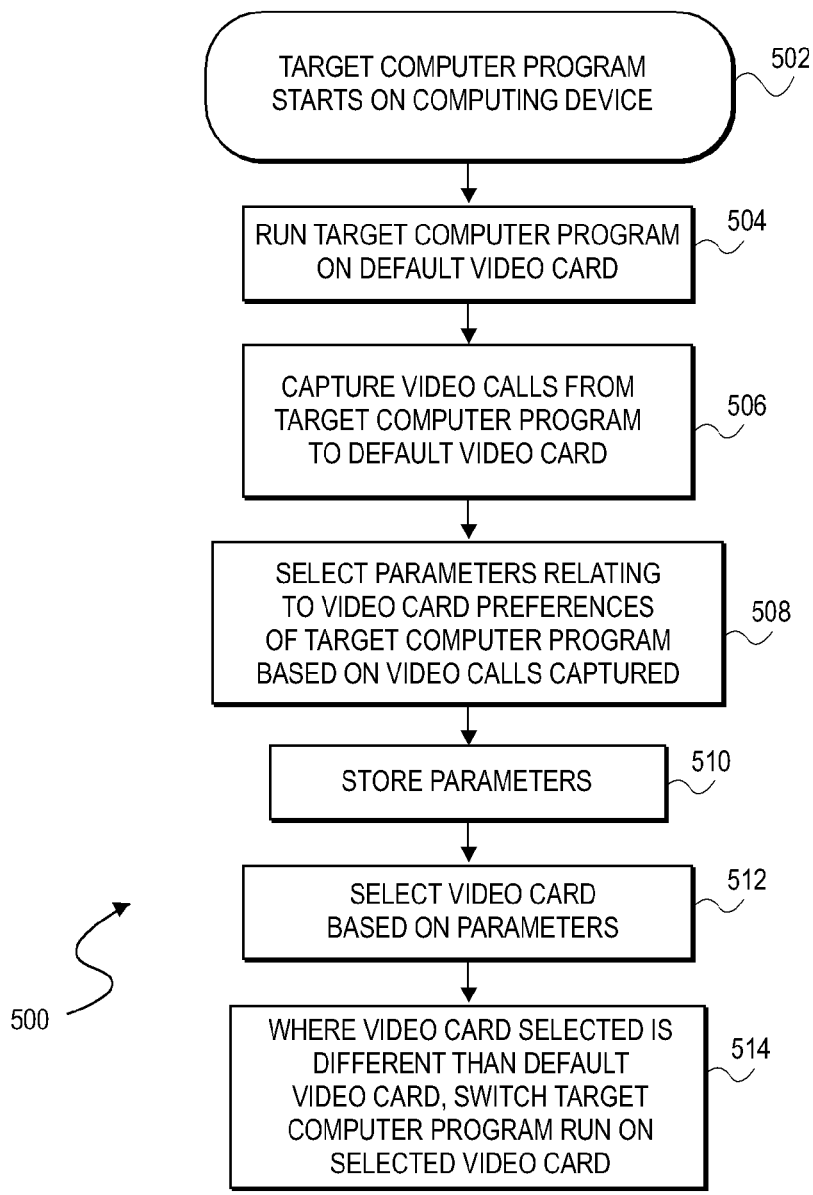

METHOD FOR RUNNING COMPUTER PROGRAM ON VIDEO CARD SELECTED BASED ON VIDEO CARD PREFERENCES OF THE PROGRAM

RELATED APPLICATIONS

The present patent application is related to the coned patent application entitled "Computing device for running computer program on video card selected based on video card preferences of the program," filed on Jun. 25, 2007, and assigned Ser. No. 11/767,706.

FIELD OF THE INVENTION

The present invention relates generally to a computing device having a number of video cards, and more particularly to running a computer program on one of the video cards of the computing device that is selected based on video card preferences of the computer program.

BACKGROUND OF THE INVENTION

At least some modern operating systems are capable of supporting multiple video cards, video chipsets, or graphics cards, within computing devices on which the operating systems are run. For example, a computing device may have two video cards, with a display device connected to each video device. The operating system running on the computing device leverages these two video cards. For instance, the operating system may expose a graphical user interface (GUI) desktop that spans the two display devices connected to the video cards. The user is thus able to run computer programs that display windows on either or both of the display devices.

Different video cards have different capabilities. For example, some video cards are able to support higher resolutions and/or more colors than other video cards. As another example, some video cards have built-in three-dimensional graphics hardware acceleration capabilities, whereas other video cards do not. As a result, a computer program that has specific video card preferences, which may include specific video card requirements, may only be able to be properly run on one of the two or more video cards within a given computing device, or, more generally, the program may only be able to use a subset of all available video cards and monitors.

Most operating systems specify default video cards, or enable a user to select a default video card, of all the video cards within the computing devices on which the operating systems are running. When a computer program is started, it is typically run on the default video card of the computing device in question. However, this default video card may not support the video card preferences of the computer program. At best, the computer program may not run as optimally as compared to when the computer program runs on a video card that does support its video card preferences.

In the worst-case scenario, however, the computer program may not be able to run at all on the default video card of the computing device in question. For instance, the computer program may be a game that requires a video card having three-dimensional graphics hardware acceleration capability. If the default video card does not have this capability, the computer program may report to the user that it is unable to be run, and then shut down. The user is forced to switch the default video card to one that has this capability, and then restart the program. Once the user has finished using the computer program, he or she may then have to switch the default video card back to the previous default video card to run other computer programs as desired.

For these and other reasons, therefore, there is a need for the present invention.

SUMMARY OF THE INVENTION

The present invention relates generally to running a target computer program on a video card selected from a number of video cards based on the video card preferences of the target computer program. A method of an embodiment of the invention determines one or more parameters relating to the video card preferences of the target computer program. In response to the target computer program being started on a computing device having a number of video cards, a video card on which to run the target computer program is selected from these video cards based on the parameters. The target computer program is then run on the video card selected.

A computer-readable medium of an embodiment of the invention has a computer program stored thereon that is executable on a computing device having a number of video cards. The computer program is to perform a method. In response to a target computer program being started on the computing device, the method determines whether one or more parameters relating to video card preferences of the target computer program have been previously selected. Where the parameters have not been previously selected, the user is requested to select the parameters from a list. A video card from the video cards of the computing device is selected for running the target computer program, based on the parameters. The target computer program is then run on the video card selected.

A computer-readable medium of another embodiment of the invention also has a computer program stored thereon that is executable on a computing device having a number of video cards. The computer program is to perform a method. The method displays a properties window for a target computer program in which one or more properties of the target computer program are displayed. The user is permitted to select one or more parameters relating to video card preferences of the target computer program, from a list of parameters displayed within the properties window. A video card is selected from the video cards of the computing device on which the target computer program is to be run, based on the parameters. The target computer program is then run on the video card selected.

A computer-readable medium of still another embodiment of the invention likewise has a computer program stored thereon that is executable on a computing device having a number of video cards. The computer program is to perform a method in response to a target computer program being started on the computing device. The method runs the target computer program on a default video card of the computing device. Video card calls from the target computer program to the default video card are captured. One or more parameters relating to video card preferences of the target computer program are selected based on the video card calls captured. A video card is selected based on these parameters. If the video card selected is different than the default video card, the target computer program is switched to running on the video card selected.

At least some embodiments of the invention provide for advantages over the prior art. A target computer program having video card preferences that are better supported by a video card of a computing device other than the default video card of the computing device is run on this video card, instead of the default video card. The user furthermore does not have to switch the default video card to the video card that better supports the video card preferences of the target computer program.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is a diagram of a computing device having multiple video cards, according to an embodiment of the invention.

FIGS. 3, 4, and 5 are diagrams of methods for selecting a video card on which to run a computer program that are consistent with but more detailed than the method of FIG. 1, according to varying embodiments of the invention.

DETAILED DESCRIPTION OF THE DRAWINGS

Figure 1:
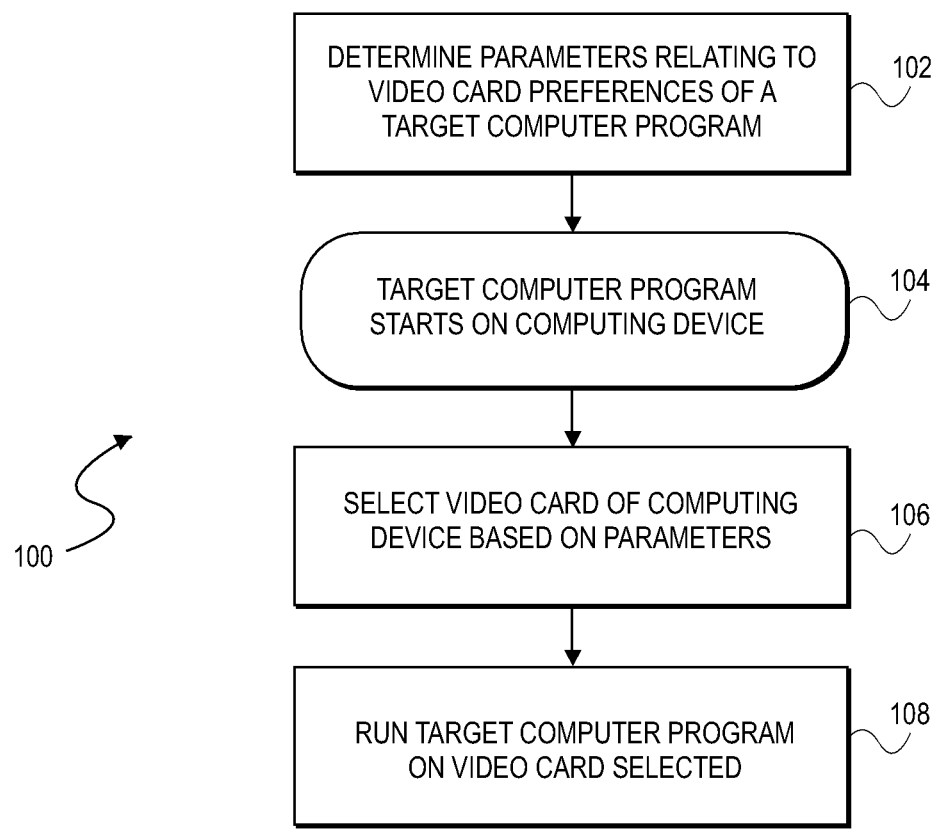
FIG. 1 is a flowchart of a method for selecting a video card on which to run a computer program without the user having to change the default video card, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

FIG. 1 shows a method 100, according to an embodiment of the invention. The method 100 determines one or more parameters relating to the video card preferences of a target computer program (102). The video card preferences may include actual video card requirements of the target computer program. For example, a computer program may require that it be run on a video card that has three-dimensional graphics hardware acceleration capability. If the computer program is attempted to be run on a video card that does not have this capability, the computer program may not run at all. In this sense, this video card preference of the computer program is a video card requirement, since the computer program cannot run on a video card that does not have this requirement, or preference.

The video card preference may further include video card preferences, but not requirements, of the target computer program. For example, a computer program may optimally run on a video card that is connected to a display device that supports and is run at a given resolution, such as 1280×1024 pixels. The computer program may be able to run on a video card that is connected to a display device that supports and is run at a lower resolution, such as 800×600 pixels, but it may not run as optimally on this video card. For instance, the computer program may want to display a large amount of information that can be completely displayed using a video card connected to a display device being run at 1280×1024 pixels, but that cannot be completely displayed using a video card connected to a display device being run at 1024×768 pixels. As such, this video card preference of the computer program is a preference, and not a requirement, since it can be run on video cards connected to display devices being run at lower resolutions.

The video card preferences of a computer program can relate to both the intrinsic capabilities of a video card, as well as to the capabilities of a video card based on the display device connected to the video card and/or the current settings of the video card. For example, three-dimensional graphics hardware acceleration capability and anti-aliasing capability, as known within the art, are intrinsic capabilities; either a video card have these capabilities, or it does not. As another example, resolution and number of colors are video card preferences that are based on the capabilities of the display device connected to the video card and/or the current settings of the video card. A video card may be able to support a resolution of 1280×1024 pixels, for instance, but the display device to which the video card is connected, and/or the current settings of the video card, may only support or specify a resolution of 1024×768 pixels. Likewise, the same or different video card may be able to support a "thousands of colors" setting, for instance, but the display device to which the video card is connected, and/or the current settings of this video card, may only support or specify sixteen colors.

The parameters relating to the video card preferences of a computer program may further specify the identity of a particular video card on the computing device on which the computer program is to be run, or may not specify the identify of such a particular video card. For example, the computing device in question may have two video cards: a first video card and a second video card. The parameters may particularly specify that the computer program is to be run on the first video card, as opposed to the second video card. Alternatively, the parameters may specify that the computer program is to be run on a video card having a particular resolution, or other capabilities, such that the parameters do not particularly specify the identity of either the first or the second video card.

Throughout this patent application, it is said that a computer program is "run" on a video card of a computing device. This terminology means that any information intended for display on a display device is displayed on the display device that is connected to the video card in question. That is, a computer program being run on a video card means that information output by the computer program is displayed on the display device connected to this video card, as opposed to being displayed on the display device connected to any other video card of the computing device.

The target computer program is started on a computing device having a number of video cards (104). For example, within a graphical user interface of an operating system running on the computing device, a user may select the target computer program to start it. As another example, the operating system may start the target computer program without direct user interaction, such as in response to a given event. For instance, the user may have previously specified that the target computer program is to start at a given time each day.

In response, one of the video cards within the computing device is selected based on the parameters relating to the video card preferences of the target computer program (106). If the identity of a particular video card is specified within the parameters, and this video card is present on the computing device, then this is the video card that is selected. If the parameters do not specify any particular video card, or the particular video card specified is not present then any video card requirements to which the parameters relate are examined vis-à-vis the video cards of the computing device. For example, if the parameters specify a video card requirement that the target computer program requires three-dimensional graphics hardware acceleration capability, and just one of the video cards within the computing device has this capability, then that video card is selected.

If the parameters specify a video card requirement satisfied by more than one of the video cards within the computing device, or if the parameters do not specify any video card requirements, then other video card preferences to which the parameters relate are examined vis-à-vis the video cards within the computing device. For example, the target computer program may prefer a resolution of at least 1280×1024 pixels. If just one of the video cards is connected to a display device that supports and is set at this resolution, then this video card is selected. Ultimately, if more than one of the video cards satisfy the parameters, then the default video card is selected, where the default video card is one of the cards that satisfy the parameters. If more than one of the video cards satisfy the parameters, but the default video card is not one of these cards, then one of the video cards that do satisfy the parameters is selected, such as in a random or other manner. It is noted that if no video cards satisfy the parameters, then the user may be provided with an error notification indicating that the target computer program cannot be run.

Thereafter, the target computer program is run on the video card that has been selected (108). The video card selected may not be the default video card specified by the operating system running on the computing device. As such, the user is able to run the target computer program on a given video card without having to first switch the default video card to the given video card. Likewise, in this situation, the user does not have to switch the default video card back to its original setting after running the target computer program on the given video card.

Computing Device Having Multiple Video Cards

FIG. 2 shows a computing device 200, according to an embodiment of the invention. The computing device 200 may be a desktop computer, a laptop computer, or another type of computing device. The computing device 200 is depicted in FIG. 2 as including a number of video cards 202A, 202B, . . . , 202N, collectively referred to as the video cards 202, and which are connected to display devices 210A, 210B, . . . , 210N, collectively referred to as the display devices 210. There are at least two video cards 202 correspondingly connected to two display devices 210. Each of the display devices 210 may or may not be part of the computing device 200. The computing device 200 is also depicted in FIG. 2 as including an operating system 204, a video card selection mechanism 206, and a target computer program 208. As can be appreciated by those of ordinary skill within the art, other components that are typically part of the computing device 200, such as memory, processors, hard disk drives, and so on, are not specifically shown in FIG. 2.

The video cards 202 may be discrete cards inserted into corresponding slots of the computing device 200, and/or integrated within the mainboard, or motherboard, of the computing device 200 itself. That is, as used herein, the terminology "video card" also encompasses display circuits built into the chipsets of the computing device 200. In general, the video cards 202 create the electronic signals required by the display devices 210 so that information can be displayed on the display devices 210 by the computing device 200.

The video cards 202 may further correspond to each of a number of display outputs of a multiple-headed video card. A multiple-headed video card is a video card that has two or more display outputs, to which two or more display devices can be connected and used at the same time. In the present patent application, each display output is said to correspond to a separate one of the video cards 202. For example, the multiple-headed video card may have separate video card circuitry to power each of its display outputs. However, as another example, the multiple-headed video card may have video card circuitry that powers all of its display outputs, but each display output is nevertheless said to correspond to a separate one of the video cards 202 herein. Therefore, in general, the number of video cards 202 from which a video card is selected for running the target computer program 208 on is said to be equal to the number of display devices 210 that are currently connected to the computing device 200 and that are capable of, and/or are, being used at the same time.

Furthermore, the terminology "video card" is used herein in a general and all-encompassing sense. Other synonymous terms used by those of ordinary skill within the art include graphics card, graphics or video adapter, graphics or video board, graphics or video controller, graphics or video display adapter, graphics or video display card, graphics or video display controller, display board, display card, and display controller, among other terms. The display devices 210 to which the video cards 202 are connected may be cathode-ray tube (CRT), displays, flat-panel displays like plasma displays or liquid-crystal displays (LCD's), or other types of display devices. The display devices 210 may each be housed separately from the computing device 200, or integrated within the housing of the computing device 200.

The operating system 204 may generally and non-restrictively be considered as the master control program that runs the computing device 200. Examples of operating systems include versions of the Microsoft Windows® operating system, available from Microsoft Corp., of Redmond, Wash., versions of the LINUX® operating system, as well as versions of the Apple Macintosh® operating system, available from Apple Computer, Inc., of Cupertino, Calif. Windows® is a registered trademark of Microsoft Corp., LINUX® is a registered trademark of Linus Torvalds, and Macintosh® is a registered trademark of Apple Computer. By comparison, the target computer program 208 is a computer program that runs on the computing device 200 via the operating system 204. The target computer program 208 may be an application program, such as a word processing program, an entertainment program, such as a game, or another type of computer program, as can be appreciated by those of ordinary skill within the art.

The video card selection mechanism 206 may be hardware, software, or a combination of hardware and software. The mechanism 206 may be a computer program that is separate from the operating system 204, or it may be part of the operating system 204. In one embodiment, the mechanism 206 may be stored in the memory (not shown) of the system 200. The mechanism 206 generally determines one or more parameters relating to video card preferences of the target computer program 208, selects one of the video cards 202 on which to run the program 208 based on these parameters, and then runs the program 208 on the video card selected. As such, the mechanism 206 may perform the method 100 of FIG. 1 that has been described, and/or perform any of the methods described in subsequent sections of the detailed description.

First Specific Embodiment

FIG. 3 shows a method 300, according to an embodiment of the invention. The method 300 is consistent with but more detailed than the method 100 of FIG. 1. The method 300 may be performed by the video card selection mechanism 206 of FIG. 2. For instance, the method 300 may be performed by a computer program. The computer program may be stored on a computer-readable medium, such as a tangible computer-readable medium like a recordable data storage medium, or another type of computer-readable medium.

The method 300 detects that a target computer program has been started on a computing device (302). The detection of the target computer program having been started may be performed by a computer program, such as a separate application program or a service, already running on the computing device. In another embodiment, the detection of the target computer program having been started may be performed by a part of the operating system running on the computing device.

In either case, in response, the method 300 determines whether parameters relating to the video card preferences of the target computer program have been previously selected and stored (304). If these parameters have not yet been selected or stored, then the user is requested to select the parameters from a list (306). For example, a window may be displayed within a graphical user interface (GUI) controlled by the operating system. The window may present the user with a list of parameters relating to video card preferences. The user may be able to select which of the parameters he or she wishes to associate as the video card preferences of the target computer program in question. Once the user has selected the parameters, they are stored (308), so that subsequent performance of the method 300 results in the method 300 proceeding directly to part 310 from part 304, without the user having to reselect the parameters.

Thereafter, the video card on which the target computer program is to be run is selected based on the parameters (310). For instance, such video card selection may be performed as has been described in detail in relation to the method 100 of FIG. 1. The target computer program is then run on the video card that has been selected (312). In this embodiment of the invention, therefore, the user selects the parameters relating to the video card preferences of the target computer program after this computer program has been started. It is noted that where there is no video card that satisfies the parameters, then the target computer program is not run, and the user may be provided with an error notification indicating that no video card satisfies the parameters, which is not explicitly depicted in FIG. 3.

Second Specific Embodiment

FIG. 4 shows a method 400, according to another embodiment of the invention. The method 400 is also consistent with but more detailed than the method 100 of FIG. 1, and may be performed by the video card selection mechanism 206 of FIG. 2. The method 400 may also be performed by a computer program stored on a computer-readable medium, such as a tangible computer-readable medium like a recordable data storage medium, or another type of computer-readable medium.

The method 400 displays a properties window for a target computer program in which properties of the program are display (402). The properties window can be the window that is normally displayed by an operating system running on the computing device in question. For example, in versions of the Microsoft Windows® operating system, right-clicking on the icon for a computer program results in the display of a context menu within which the user can select a properties item. Selecting the properties item results in display of the properties window. As can be appreciated by those of ordinary skill within the art, the properties window normally allows a user to select the identity of the computer program with which the icon is associated, what directory the computer program should be run in, the type of window the computer program should be run in, as well as other properties that can be modified by the user.

The user is thus permitted to select parameters relating to the video card preferences of the target computer program from a list of such parameters displayed within the properties window (404). In this embodiment, therefore, the user is able to select the parameters without having to have first start the target computer program. Rather, the user can simply select the parameters by calling up the properties window for the target computer program. It is noted that this embodiment may also be used in conjunction with the embodiment of FIG. 3. Thus, if the user does not pre-select the parameters via the properties window, then he or she is afforded an opportunity to select the parameters when the target computer program is started, as in FIG. 3.

The parameters selected by the user are stored (406). As in the embodiment of FIG. 3, storing the parameters means that the user does not have to reselect the parameters later. Thereafter, the target computer program is started on the computing device (408). In response, the method 400 selects which video card of the computing device on which to run the target computer program, based on the parameters that have been selected by the user and stored (410). The target computer program is then run on the video card selected (412). In both the embodiment of FIG. 3 and the embodiment of FIG. 4, then, the user selects the parameters relating to the video card preferences of the target computer program, on which basis a video card on which this computer program is to be run is selected.

Third Specific Embodiment

FIG. 5 shows a method 500, according to another embodiment of the invention. The method 500 is also consistent with but more detailed than the method 100 of FIG. 1, and may be performed by the video card selection mechanism 206 of FIG. 2. The method 500 may further be performed by a computer program stored on a computer-readable medium, such as a tangible computer-readable medium like a recordable data storage medium, or another type of computer-readable medium.

A target computer program is started on a computing device (502). In response, the method 500 runs the target computer program on the video card of the computing device that has been previously specified as the default video card (504). For instance, the operating system running on the computing device may specify one of the video cards of the computing device as that which is the default video card for the computing device, where the default video card specification may be changed by the user if desired.

It is noted that even if the default video card is not able to optimally run the target computer program, or run the target computer program for a great length of time without having to terminate prematurely, the target computer program in great likelihood will be able to run on the default video card for at least a short period of time. For example, the target computer program may require that the video card on which it runs has three-dimensional graphics hardware capability, which the default video card may not have. As a result, once the target computer program learns that the default video card does not have this capability, the program may terminate prematurely, without performing its intended functionality as may be desired by the user. However, until the computer program terminates, it is in fact running on the default video card, which allows part 506 of the method to be performed.

Thus, video calls from the target computer program to the default video card are captured while the target computer program is running on the default video card (506). In general, a computer program interacts with a video card by calling functions that may be exposed by an application programming interface (API) of a driver for the video card within the operating system. A driver is a set of computer program routines that links the operating system to a hardware device, such as a video card, and includes the precise machine language needed for the device to perform the functions requested by computer programs like the target computer program.

The video calls that are captured are thus the calls by the target computer program to the driver for the default video card. The video calls provide information as to the expectations that the target computer program has for the desired video card. For instance, the video calls may request that the default video card perform three-dimensional graphics acceleration in hardware, a capability that the default video card may or may not have. As another example, the video calls may request that the default video card perform anti-aliasing in hardware, a capability that the default video card also may or may not have.

Thereafter, the parameters relating to the video card preferences of the target computer program may be selected based on these captured video calls (508). In one embodiment, the parameters are specifically for preferences that are requirements, insofar as the target computer program requesting the default video card to perform some type of functionality can imply that the program requires that this video card have the capability to perform the requested functionality. Alternatively, however, the parameters selected in part 508 may not be related to video card requirements, but rather to other types of video card preferences that are not requirements.

The parameters are then stored (510). In this way, the embodiment of FIG. 5 may be used in relation to the embodiment of FIG. 4, for instance. That is, the embodiment of FIG. 5 is different than the embodiments of FIGS. 3 and 4 in that the parameters relating to the video card preferences of the target computer program are selected without any interaction with the user, such that the user does not in fact select the parameters. However, once the parameters have been selected in part 508 and stored in part 510, the user may be able to modify them via performing of the method 400 of FIG. 4, in which the user calls up the properties window for the target computer program in order to modify these parameters.

The video card on which the target computer program is to be optimally run is then selected based on these parameters (512). It is noted that the target computer program already is running, or had been running before premature termination, on the default video card, due to performance of part 504 of the method 500. Therefore, if the selected video card is different than the default video card, then the target computer program is switched so that it runs on the selected video card (514). That is, if the target computer program is still running on the default video card, it is switched from running on the default video card to running on the selected video card. If the target computer program is no longer running on the default video card, as a result of premature termination, for instance, then it is restarted on the selected video card in part 514.

CONCLUSION

It is noted that, although specific embodiments have been illustrated and described herein, it will be appreciated by those of ordinary skill in the art that any arrangement calculated to achieve the same purpose may be substituted for the specific embodiments shown. For example, whereas three distinct embodiments of the invention have been described in relation to FIGS. 3, 4, and 5, these embodiments may be employed in conjunction with one another as well, as has been alluded to within the previous sections of the detailed description. This application is thus intended to cover any adaptations or variations of embodiments of the present invention. Therefore, it is manifestly intended that this invention be limited only by the claims and equivalents thereof.

I claim:
1. A method comprising:
   determining a parameter relating to video card preferences of a target computer program, by, while the target computer program is running on a computing device having a plurality of video cards, capturing video card calls from the target computer program, and selecting the parameter based on the video card calls captured from the target computer program;
   in response to starting the target computer program on the computing device,
   selecting a video card, from the plurality of video cards of the computing device, to run the target computer program on, based on the parameter; and
   running the target computer program on the video card selected; and
   storing the parameter relating to the video card preferences of the target computer program as selected, wherein later reselection of the parameter is avoided.

2. The method of claim 1, wherein determining the parameter relating to the video card preferences of the target computer program comprises requesting a user to select the parameter from a list of parameters.

3. The method of claim 2, wherein requesting the user to select the parameter from the list of parameters comprises:
   detecting that the target computer program has been started on the computing device; and, in response, displaying a window in which the user is requested to select the parameter.

4. The method of claim 3, wherein another computer program running on the computing device detects that the target computer program has been started on the computing device and in response displays the window in which the user is requested to select the parameter.

5. The method of claim 3, wherein an operating system running on the computing device detects that the target computer program has been started on the computing device and in response displays the window in which the user is requested to select the parameter.

6. The method of claim 2, wherein requesting the user to select the parameter from the list of parameters comprises:
   displaying a properties window for the target computer program in which one or more properties of the target computer program are displayed, including the list of parameters; and,
   permitting a user to select the parameter relating to the video card preferences of the target computer program from the list of parameters displayed within the properties window for the target computer program.

7. The method of claim 2, wherein determining the parameter relating to the video card preferences of the target computer program further comprises storing the parameter relating to the video card preferences of the target computer program as selected by the user, wherein the user does not have to reselect the parameter later.

8. The method of claim 1, wherein determining the parameter relating to the video card preferences of the target computer program comprises:
   determining whether the parameter relating to the video card preferences of the target computer program have already been selected; and,
   where the parameter has already been selected, using the parameter as has already been selected.

9. The method of claim 1, further comprising, in response to starting the target computer program on the computing device having the plurality of video cards, initially running the target computer program on a default video card of the plurality of video cards of the computing device, wherein thereafter a different video card is selected based on the parameter relating to the video card preferences of the target computer program, and the target computer program is run on the different video card selected by switching the target computer program to the different video card selected.

10. The method of claim 1, wherein the parameter relating to the video card preferences of the target computer program comprises an identity of one of the plurality of video cards of the computing device on which the target computer program is to be run.

11. The method of claim 1, wherein the parameter relating to the video card preferences of the target computer program does not include an identity of any of the plurality of video cards of the computing device on which the target computer program is to be run.

12. The method of claim 1, wherein the parameter related to the video card preferences of the target computer program comprises one of:
   whether three-dimensional hardware acceleration capability is needed by the target computer program;
   whether anti-aliasing capability is desired or needed by the target computer program;
   a number of colors desired or needed by the target computer program; and,
   a resolution desired or needed by the target computer program.

13. The method of claim 1, wherein the video card preferences of the target computer program comprise video card requirements of the target computer program.

14. A non-transitory computer-readable medium having a computer program stored thereon and executable on a computing device having a plurality of video cards, the computer program to perform a method comprising:
   in response to a target computer program being started on the computing device,
   determining whether a parameter relating to video card preferences of the target computer program has been previously selected; where the parameter has not been previously selected,
   determining the parameter, by, while the target computer program is running on the computing device, capturing video card calls from the target computer program, and selecting the parameter based on the video card calls captured from the target computer program;
   selecting a video card, from the plurality of video cards of the computing device, to run the target computer program on, based on the parameter; and
   storing the parameter relating to the video card preferences of the target computer program as selected, wherein later reselection of the parameter is avoided.

15. The non-transitory computer-readable medium of claim 14, wherein the computer program is a different computer program than an operating system running on the computing device.

16. The non-transitory computer-readable medium of claim 14, wherein the computer program is part of an operating system running on the computing device.

17. The non-transitory computer-readable medium of claim 14, wherein the parameter related to the video card preferences of the target computer program comprises one of:
   whether three-dimensional hardware acceleration capability is needed by the target computer program;
   whether anti-aliasing capability is desired or needed by the target computer program;
   a number of colors desired or needed by the target computer program; and, a resolution desired or needed by the target computer program.

18. A non-transitory computer-readable medium having a computer program stored thereon and executable on a computing device having a plurality of video cards, the computer program to perform a method comprising:
   determining a parameter relating to video card preferences of a target computer program, by, while the target computer program is running on the computing device,
   capturing video card calls from the target computer program, and selecting the parameter based on the video card calls captured from the target computer program;
   in response to starting the target computer program on the computing device,
   selecting a video card, from the plurality of video cards of the computing device, to run the target computer program on, based on the parameter; and
   running the target computer program on the video card selected; and
   storing the parameter relating to the video card preferences of the target computer program as selected, wherein later reselection of the parameter is avoided.

19. The non-transitory computer-readable medium of claim 18, wherein the parameter relating to the video card preferences of the target computer program comprises an identity of one of the plurality of video cards of the computing device on which the target computer program is to be run.

20. A non-transitory computer-readable medium having a computer program stored thereon and executable on a computing device having a plurality of video cards, the computer program to perform a method comprising, in response to a target computer program being started on the computing device:
   running the target computer program on a default video card of the plurality of video cards of the computing device;
   capturing video card calls from the target computer program to the default video card;
   selecting a parameter relating to video card preferences of the target computer program based on the video card calls captured;
   selecting a video card, from the plurality of video cards of the computing device, based on the parameter;
   where the video card selected is different than the default video card, switching the target computer program to run on the video card selected; and
   storing the parameter relating to the video card preferences of the target computer program as selected, wherein later reselection of the parameter is avoided.

21. The non-transitory computer-readable medium of claim 20, wherein the parameter related to the video card preferences of the target computer program comprises one of:
   whether three-dimensional hardware acceleration capability is needed by the target computer program;
   whether anti-aliasing capability is desired or needed by the target computer program;

a number of colors desired or needed by the target computer program; and, a resolution desired or needed by the target computer program.

\* \* \* \* \*